United States Patent Office 3,155,169
Patented Nov. 3, 1964

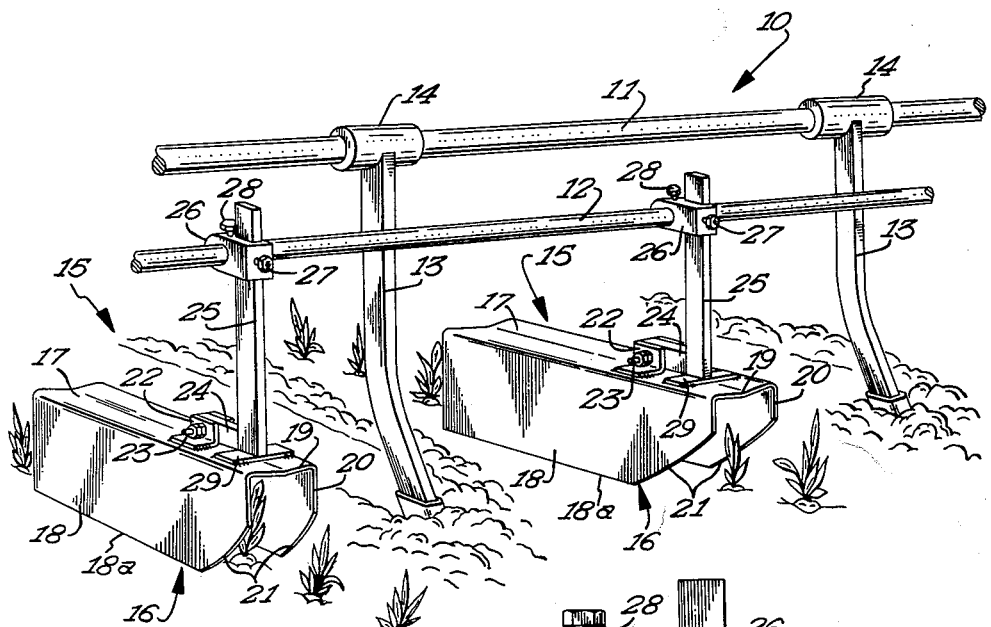
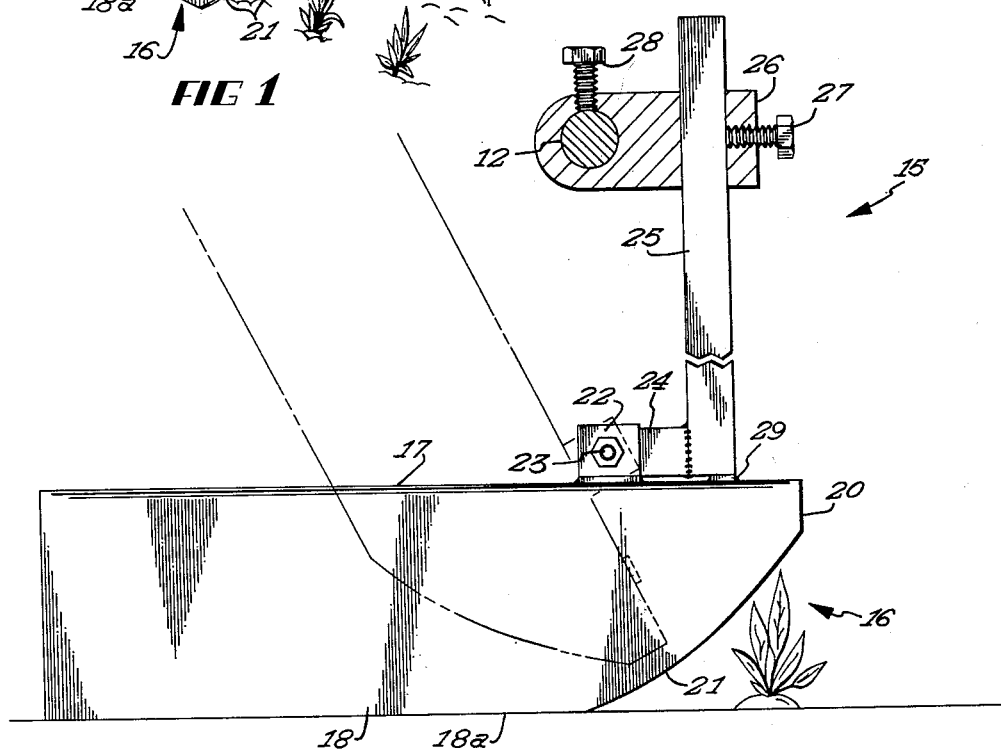

3,155,169
CULTIVATOR SHIELD DEVICE
Elvin Mattson and Allen D. Mattson, Grafton, N. Dak.
Filed Feb. 4, 1964, Ser. No. 342,513
3 Claims. (Cl. 172—512)

This invention relates to cultivator shield devices and more particularly to a self-cleaning cultivator shield device.

An object of this invention is to provide a novel cultivator shield device, of generally inverted channel-shaped configuration which is adapted to be moved longitudinally of a row of plants to be cultivated in straddling relation therewith, and which is uniquely suspended from a tool bar whereby when an obstruction is encountered the cultivator device may pivot, thus producing a self-cleaning action.

Another object of this invention is to provide a novel and improved, generally channel-shaped cultivator shield device pivotally supported from a tool bar by a generally L-shaped standard to permit longitudinal travel of the cultivator device in straddling relation with respect to a row of plants whereby to shield the plants from dirt thrown by the cultivator implements during the cultivating operation, the pivotal axis of the shield member being located adjacent the leading edge thereof whereby upon forward tilting of the shield member, the leading edge thereof will clear the surface of the ground when an obstruction is encountered and any debris accumulating within the confines of the front portion of the shield member will be forced therefrom.

A further object of this invention is to provide a novel and improved cultivator shield device of the class described wherein the leading edge of the vertical side portions of the shield member curve rearwardly and downwardly, thus presenting a smoothly arcuate surface which facilitates traversal of the shield member over uneven terain or over obstructions which may be encountered thereby.

These and other objects and advantages of our invention will more fully appear from the following description made in connection with the accompanying drawing wherein like character references refer to the same or similar parts throughout the several views, and in which:

FIG. 1 is a front perspective view of a portion of a cultivator frame apparatus having our novel rotary cultivator shield devices mounted thereon; and FIG. 2 is a side elevational view on an enlarged scale of the cultivator shield device wherein the device is illustrated in an adjusted position by dotted line configuration.

Referring now to the drawing, it will be seen that one embodiment of our novel cultivator shield device is thereshown. It will be seen in FIG. 1 that a portion of a conventional cultivator frame apparatus, designated generally by the reference numeral 10, includes a tool bar 11 and a tool bar 12, the cultivator frame apparatus preferably mounted on a conventional tractor in a well known manner. The tool bar 11 of the cultivator frame apparatus has a plurality of cultivator shovels secured thereto by suitable standards 13, the upper portion of the standards 13 being secured by suitable coupling means 14 to the tool bar 11.

These cultivator shovels are laterally spaced-apart longitudinally of the tool bar 11, the spacing between adjacent cultivator shovels being dependent upon the width of the rows being cultivated. It will be appreciated that cultivator frame apparatus of the type illustrated in the drawing are adapted to accommodate a plurality of cultivator shovels for simultaneously cultivating a plurality of rows of plants such as sugar beets and the like. The cultivator shovels are adapted to be moved below the surface between adjacent rows of plants such as sugar beets and the soil being cultivated will be thrown laterally and slightly rearwardly by the cultivator shovels. It is therefore necessary to provide shielding means to protect the adjacent rows of plants from debris, lumps of earth and the like which are thrown by the cultivator shovels during the cultivating operation.

To this end, we have provided a novel cultivator shield device which is detachably mounted on the cultivator frame apparatus and which serves to very effectively protect the rows of plants during the cultivating operation. Referring again to FIG. 1 it will be seen that each cultivator shield device, designated generally by the reference numeral 15, is detachably suspended from the tool bar 12 and is adapted to be moved longitudinally of a row of the crops being cultivated and in straddling relation therewith. Thus the cultivator shield devices and cultivator shovels are alternately arranged with respect to each other.

Each cultivator shield device 15 includes an inverted substantially channel-shaped elongate cultivator shield member 16 preferably constructed of a suitable heavy gauge metallic material. Each shield member 16 includes a normally horizontally oriented top 17 having substantially identical spaced-apart vertical sides 18 integrally formed with the longitudinal edges thereof and depending therefrom. In the embodiment shown, the top 17 while being substantially flat has a slightly concave upper surface and a slightly convex lower surface and the sides 18 diverge slightly downwardly. The lower longitudinal edges 18a of the sides 18 are substantially straight and are adapted to engage and slightly penetrate the surface of the ground being traversed. It will be seen that the sides 18 are disposed on opposite sides of a row of plants being cultivated and in the embodiment shown, the sides have a height or vertical dimension of approximately seven inches. This particular size is especially adapted for use with beans, sugar beets and the like.

The front or leading edge 19 of the top 17 is substantially straight and is disposed in substantially perpendicular or normal relation to the direction of travel of the shield member. The sides 18 each have a leading edge including a top portion 20 and a rearwardly curved lower portion 21. It will be seen that the top portions 20 of the sides 18 together with the leading edge 19 of the top 17 lie in a single vertical plane and actually define a continuous leading edge portion of the cultivator shield member 16.

The top 17 of the cultivator shield member 16 has a pair of spaced-apart substantially identical attachment ears welded to the upper surface thereof adjacent the leading edge of the cultivator shield member 16. These ears are suitably apertured and receive a pivot bolt assembly 23 therethrough which also extends through an aperture in the lower horizontal rearward extension 24 of a generally L-shaped standard 25. It will be seen that the upper end portion of the standard 25 is secured to the tool bar 12 by a suitable coupling member 26 which, as seen, is of conventional construction. This coupling member 26 is provided with a vertically extending opening therein through which projects the standard 25, the latter being vertically adjustable relative to the coupling member 26 and being secured in an adjusted relation by a suitable set screw element 27. The coupling member 26 is also provided with a horizontal transversely extending opening therethrough which accommodates the tool bar 12, thus permitting longitudinal adjustment of the coupling member 26 relative to the tool bar 12. The coupling member 26 is secured in an adjusted relation relative to the tool bar 12 by means of a set screw element 28.

Referring again to FIG. 1 it will be seen that a plurality of the cultivator shield devices 15 will be mounted from the tool bar 12 and will be spaced-apart a distance corresponding substantially to the width or distance between adjacent rows to be cultivated. These cultivator shields are disposed in straddling relation with respect to the row of plants being cultivated so that the lower longitudinal edges 18a of the sides 18 engage and preferably slightly penetrate the surface of the ground adjacent the row of plants being cultivated. During the cultivating operation, the cultivator shovels will be moved below the surface of the ground and will throw soil, debris and the like rearwardly and laterally but the row of plants adjacent the cultivator shovels will be protected against this impelled material by the cultivator shield member 16.

If an obstruction is disposed in the path of the cultivator shield, the relieved front portion of the sides of the cultivator defined by the lower curved portion 21 of the leading edge of the side will permit at least the front portion of the cultivator shield member 16 to at least partially clear such an obstruction during travel of the shield member. To this end, reference is made to FIG. 2 wherein it will be seen that the lower curved portion of the leading edge of the sides 18 terminates substantially below or slightly rearwardly of the axis of pivot of the cultivator shield member 16. Restated, if a vertical plane were drawn through the axis of pivot of the shield member 16 and normal to the surface of the ground, such a plane would pass through or slightly forwardly of the lower terminal end of each of the lower curved leading edge portions 21 of the sides 18.

Therefore unless an obstruction is quite large, a major portion of the length of the lower curved portion 21 of the leading edge of the shield member will pass over such an obstruction and will not engage the obstruction until the point of contact the rebetween is substantially below or only slightly forwardly of the pivotal axis of the shield member. When such an obstruction is engaged by the leading edge of the shield member 16, the resultant force produced by the forward movement of the shield member plus the engagement of such an obstruction will tend to pivot the front end of the shield member upwardly, but this upward movement is resisted by the L-shaped standard 25. To this end, it is pointed out that the top 17 of the cultivator shield member 16 has an impact plate 29 welded or otherwise affixed thereto below the standard 25 and adapted to be engaged by the standard 25 when the latter is pivoted against the shield member. This arrangement prevents damage to the shield member during pivoting movement thereof relative to the standard 25.

As the cultivator shield member 16 moves forwardly with respect to such an obstruction, the pivotal axis of the shield member will be moved forwardly whereby the pivotal axis thereof will be disposed forwardly of the apex or high point of such an obstruction whereby the resultant force produced by the movement of the shield member and the obstruction will cause upward swinging movement of the rear end portion of the shield member. The curved leading edge portion 21 of each of the sides 18 permits the shield member to roll over such an obstruction during the pivoting movement thereof whereby to permit the shield member to more easily traverse such an obstruction.

If an obstruction within the path of the cultivator shield member 16 constitutes a pile of debris, dirt clods or the like, some of this material may be forced between the sides 18 of the shield member 16 and in wedged relation therewith. The recessed or inclined leading edge portions of the sides causes some of such wedged debris to project forwardly of the shield member, whereby upon tilting movement of the shield member as illustrated by the dotted line configuration in FIG. 2, the debris will be dragged across the surface of the ground and the shield member will have the material removed therefrom. Thus it will be seen that the particular construction and operation of the cultivator shield members as described herein, not only permits effective traversal of the obstructions which may lie in the path of such cultivator shield members, but a self-cleaning action is produced during pivoting movement of the shield members.

Referring again to FIG. 2, it will be noted that the horizontal distance from the pivotal axis of the shield member to the leading edge 19 of the top 17 is substantially less than the distance from the pivotal axis to the surface of the ground. Thus the height or vertical dimensions of the sides 18 are substantially greater than the distance from the pivotal axis of the shield members to the leading edge 19 of the top 20 whereby upon upwardly swinging movement of the rear end portion of the shield member, the leading edge of the shield member will be spaced above the surface of the ground even though the shield member be swung through an arc of approximately ninety degrees. This arrangement allows any debris or other material which might be projecting forwardly of the shield member to engage and to be dragged over the surface of the ground during pivoting movement of the shield member and to be removed therefrom. The shield member will be returned to its horizontal position upon the surface of the ground by action of gravity after an obstruction has been traversed by the shield member.

It will therefore be seen from the foregoing description that we have provided a novel cultivator shield device which is especially adaptable for use in the cultivation of sugar beets, peas and the like. When such plants are relatively small, these plants may be easily damaged and through the use of our novel cultivator shield device, not only are these plants protected against dirt, debris and the like thrown by the cultivator shovels, but the cultivator shield members are operable to negotiate obstructions and to produce a self-cleaning action to thereby minimize any damage to the plants which might result from the accumulation of material at the front portion of the cultivator shield members.

Thus it will be seen that we have provided a novel cultivator shield device which is not only of simple and inexpensive construction but devices which functions in a more efficient manner than any heretofore known comparable devices.

It will, of course, be understood that various changes may be made in the form, details, arrangement and proportions of the various parts without departing from the scope of our invention.

What is claimed is:

1. A cultivator shield device for use with crop cultivator apparatus of the type having cultivator tools, such as shovels, which tend to throw dirt towards the crop being cultivated, said cultivator shield device comprising an elongate generally inverted channel-shaped cultivator shield member adapted to be moved longitudinally along a row of plants being cultivated and in straddling relation therewith, said shield member having a substantially flat horizontal top, and substantially flat vertical sides integrally formed with and diverging slightly from opposite edges of said top, said sides having substantially straight longitudinally disposed lower edges adapted to engage the surface of the ground during movement of the cultivator shield member and having leading edges which extend arcuately upwardly from said lower edges, an elongate vertically extending standard detachably mounted adjacent its upper end in fixed relation to a tool bar of a cultivator apparatus, said standard having a rearwardly projecting elongate horizontally disposed extension affixed to the lower end thereof, means pivotally connecting the rear end of said horizontal extension of said standard with the top of the shield member adjacent the leading edge thereof, said horizontal extension engaging the upper surface of the shield member to prevent upward tilting movement of the forward portion of the shield member but to permitting downward tilting of the forward portion of said shield member about a substantially transversely extending horizontal axis, the vertical distance between a line extending from the axis of pivot of the shield member to the surface of the ground and substantially normal thereto being greater than the horizontal distance between said axis of pivot and the leading edge of said cultivator shield member whereby the leading edge of the cultivator shield member will be spaced above the surface of the ground when the rear end portion of said shield member is raised.

2. The cultivator shield device as defined in claim 1 wherein the lower terminal end of the leading edge of each side of said cultivator shield member is disposed below and in substantial vertical alignment with the axis of pivot of said shield member when the latter is in a horizontal position.

3. The cultivator shield device as defined in claim 1 wherein said standard is positioned rearwardly of the forwardmost end of the leading edge of the shield member.

References Cited by the Examiner
UNITED STATES PATENTS 2,718,185   9/55   Shawd _____ 172—512 X T. GRAHAM CRAVER, *Primary Examiner.*